(12) United States Patent
Hiyoshi

(10) Patent No.: US 10,334,139 B2
(45) Date of Patent: Jun. 25, 2019

(54) IMAGE DECOLORING APPARATUS AND METHOD SETTING PASSWORD TO ACCESS DIFFERENCE OF IMAGE DATA READ BEFORE AND AFTER HEATING

(71) Applicant: TOSHIBA TEC KABUSHIKI KAISHA, Shinagawa-ku, Tokyo (JP)

(72) Inventor: Kimihiko Hiyoshi, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/000,302

(22) Filed: Jun. 5, 2018

(65) Prior Publication Data

US 2019/0075219 A1    Mar. 7, 2019

(30) Foreign Application Priority Data

Sep. 1, 2017  (JP) .................................. 2017-168464

(51) Int. Cl.
| | |
|---|---|
| *B41M 7/00* | (2006.01) |
| *H04N 1/32* | (2006.01) |
| *H04N 1/44* | (2006.01) |
| *H04N 1/60* | (2006.01) |

(52) U.S. Cl.
CPC ............ *H04N 1/60* (2013.01); *B41M 7/0009* (2013.01); *H04N 1/32133* (2013.01); *H04N 1/444* (2013.01); *H04N 1/448* (2013.01); *H04N 1/4413* (2013.01)

(58) Field of Classification Search
None
See application file for complete search history.

(56) References Cited

U.S. PATENT DOCUMENTS

| | | | | |
|---|---|---|---|---|
| 8,743,164 | B2* | 6/2014 | Iguchi ....................... | B41J 2/32 347/179 |
| 8,879,976 | B2* | 11/2014 | Fujiwara ............ | G03G 15/6573 399/341 |
| 9,025,210 | B2* | 5/2015 | Tomizawa ......... | H04N 1/00127 358/1.9 |
| 9,182,727 | B2* | 11/2015 | Yoshida ............. | H04N 1/32133 |
| 9,242,476 | B2* | 1/2016 | Yoshida ............. | G03G 15/6585 |
| 9,266,374 | B1* | 2/2016 | Sugiyama ............ | B41M 7/0009 |
| 9,465,349 | B2* | 10/2016 | Hashidume .......... | G03G 9/0926 |
| 9,487,042 | B2* | 11/2016 | Hiyoshi ............... | B41M 7/0009 |
| 9,871,936 | B2* | 1/2018 | Hibino .................. | G03G 15/01 |

(Continued)

FOREIGN PATENT DOCUMENTS

| | | |
|---|---|---|
| JP | 2005-149097 A | 6/2005 |
| JP | 2016-082412 A | 5/2016 |

*Primary Examiner* — Scott A Rogers
(74) *Attorney, Agent, or Firm* — Foley & Lardner LLP

(57) ABSTRACT

An image decoloring apparatus includes a reader configured to read an image on a sheet to acquire image data, a storage section configured to store the image data acquired by the reader, and a first heater configured to heat the sheet. The apparatus further includes a difference extractor configured to extract difference image data based on first image data read from the sheet before it is heated by the first heater and second image data read from the sheet after it is heated by the first heater. The apparatus additionally includes a setting section configured to set a password required to access the difference image data.

16 Claims, 11 Drawing Sheets

(56) References Cited

U.S. PATENT DOCUMENTS

| | | | |
|---|---|---|---|
| 10,185,261 B1* | 1/2019 | Iguchi | G03G 15/2053 |
| 10,194,043 B2* | 1/2019 | Takahashi | H04N 1/00801 |
| 10,200,550 B2* | 2/2019 | Koike | G03G 15/5025 |
| 2013/0070265 A1* | 3/2013 | Megawa | H04N 1/40 358/1.9 |
| 2017/0015128 A1* | 1/2017 | Nishimura | B41M 7/0009 |
| 2018/0191922 A1* | 7/2018 | Sasano | H04N 1/32133 |
| 2018/0309899 A1* | 10/2018 | Kurosawa | H04N 1/32352 |

* cited by examiner

FIG.7

ADDRESSER:AAAAA
DESTINATION:BBBBB
DATE:17/04/06
TITLE: THE DECOLORING PROCESS IS COMPLETED.
ATTACHED FILE:XXXXXXXX.jpg TEXT:
THE DECOLORING PROCESS IS COMPLETED.
THE FOLLOWING PASSWORD IS NECESSARY TO INPUT IN ORDER TO RECOVER THE ORIGINAL IMAGE.
Password: ABCDEFG

IMAGE DECOLORING APPARATUS AND METHOD SETTING PASSWORD TO ACCESS DIFFERENCE OF IMAGE DATA READ BEFORE AND AFTER HEATING

CROSS-REFERENCE TO RELATED APPLICATION

This application is based upon and claims the benefit of priority from Japanese Patent Application No. 2017-168464, filed Sep. 1,2017, the entire contents of which are incorporated herein by reference.

FIELD

Embodiments described herein relate generally to an image decoloring apparatus having a function of extracting and managing characters and figures written with ink decolored when heated from a sheet.

BACKGROUND

An image decoloring apparatus having an image reading function and an image decoloring function is known.

Before a decoloring process, the image decoloring apparatus reads a sheet on which characters and figures (hereinafter, referred to as a handwritten image) written with decolorable ink decolored when heated and an image formed with color material decolored at a temperature different from that of the decolorable ink are printed. Thereafter, the image on the sheet is decolored, and the sheet after the image decoloring is read again. As a result, the image decoloring apparatus acquires image data before and after the image decoloring process. The image decoloring apparatus separates image data corresponding to the handwritten image and image data corresponding to an image other than the handwritten image based on the image data acquired before and after the image decoloring process.

DESCRIPTION OF THE DRAWINGS

FIG. 7 is a diagram illustrating a notification mail for a password according to the first embodiment;

DETAILED DESCRIPTION

In accordance with at least one embodiment, an image decoloring apparatus comprises a reading section configured to read an image on a sheet to acquire image data, a storage section configured to store the image data acquired by the reading section, a first heating section configured to heat the sheet, a difference extraction section configured to extract difference image data based on first image data read from the sheet before heated by the first heating section and second image data read from the sheet after it is heated by the first heating section, and a setting section configured to set a password necessary for the use of the difference image data (i.e., the password may be required in order to access the difference image data).

Hereinafter, embodiments of the present invention will be described with reference to the accompanying drawings.

First Embodiment

An image decoloring apparatus 100 decolors an image formed by a decolorable toner formed on a sheet by applying heat to the sheet. Here, the decolorable toner is formed by containing a decolorable material in a coloring material. The decolorable toner is decolored (including for a case in which an image formed with chromatic colors as well as achromatic colors such as white and black becomes visually invisible) when heated. Similarly, the image decoloring apparatus 100 can decolor an image formed with decolorable ink.

Figure 1:
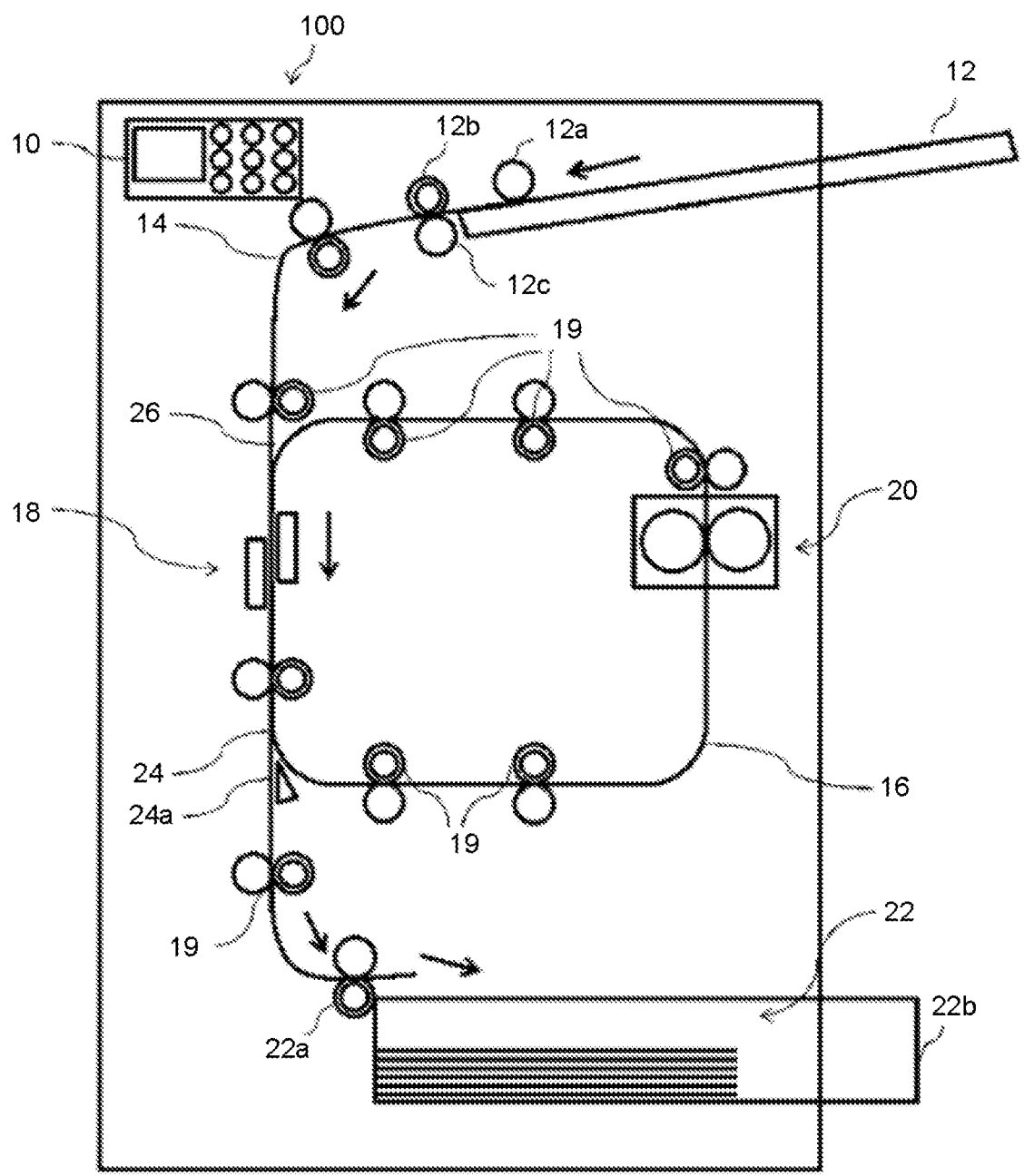
FIG. 1 is a cross-sectional view illustrating an image decoloring apparatus according to a first embodiment.

FIG. 1 is a cross-sectional view of the image decoloring apparatus 100 according to the first embodiment. The image decoloring apparatus 100 has a control panel 10, a sheet feed tray 12, a first conveyance path 14, a second conveyance path 16, a reading section (reader) 18, a heating section (heater) 20, and a sheet discharge section (sheet discharger) 22.

The control panel 10 has a display section (a display) and an operation section (an operation panel). The display section is, for example, a liquid crystal display or an organic EL (Electro Luminescence) display. The display section displays various information relating to the image decoloring apparatus 100. The control panel 10 includes a plurality of buttons to receive an operation by a user. The operation section outputs a signal in response to the operation performed by the user to a controller 30 described later. The display section and the operation section may be integrally configured as a touch panel.

The sheet feed tray 12 stacks sheets to be reused. The sheet to be reused may be, for example, a sheet on which an image is formed with the decolorable toner. The sheet may have various sizes such as A3, A4, B5, etc. The sheet feed tray 12 is provided with a pickup roller 12a, a sheet feed roller 12b, and a separation roller 12c which is arranged to face the sheet feed roller. These rollers convey the sheets one by one to the first conveyance path 14.

The first conveyance path 14 extends from the sheet feed tray 12 to the sheet discharge section 22. Along the first conveyance path 14, a bifurcating point 24, a junction point 26, a reading section 18 and a plurality of conveyance rollers 19 which are described later are provided.

The second conveyance path 16 is connected to the first conveyance path 14 at the bifurcating point 24 and the junction point 26 provided at the upstream side of the bifurcating point 24 in the first conveyance path 14. In other words, the first conveyance path 14 and the second conveyance path 16 form a circular path. The second conveyance path 16 has a plurality of conveyance rollers 19. The bifurcating point 24 has a bifurcating member 24a. The controller 30 conveys the sheet conveyed along the first conveyance path 14 to the second conveyance path 16 by setting the bifurcating member 24a in a driven state. The controller 30 conveys the sheet conveyed along the first conveyance path 14 to the sheet discharge section 22 described later by setting the bifurcating member 24a in a non-driven state.

The reading section 18 is arranged between the junction 26 and the bifurcating point 24 along the first conveyance path 14. The reading section 18 is, for example, a scanner which reads images on both sides or a target sheet. The image data read by the reading section 18 is stored in a storage section 40 described later. The image data stored in the storage section 40 may be transmitted to another image forming apparatus or an information processing apparatus such as a PC via a network.

The heating section 20 is arranged along the second conveyance path 16. The heating section 20 has a roller pair and a heater, and the roller pair is heated by the heater. The heating section 20 heats an image formed with the decolorable ink or the decolorable toner to decolor the image by applying a certain amount or more of heat to the sheet via the heated roller pair.

The sheet discharge section 22 is arranged at the downstream side of the bifurcating point 24 along the first conveyance path 14. The sheet discharge section 22 has a sheet discharge roller 22a and a sheet discharge tray 22b. The sheet discharge roller 22a discharges the sheet conveyed a long the first conveyance path 14 to the sheet discharge tray 22b. The sheet discharge tray 22b accommodates discharged sheets.

The conveyance path and a decoloring process of the sheet conveyed along the first conveyance path 14 and the second conveyance path 16 are described. The sheet fed from the sheet feed tray 12 is conveyed along the first conveyance path 14. Thereafter, when the sheet roaches the bifurcating point 24, the sheet is conveyed to the second conveyance path 16 via the bifurcating member 24a in the driven state. The sheet conveyed along the second conveyance path 16 is heated by the heating section 20, and thus, an image I1 (hereinafter, referred to as a first image) formed with the decolorable toner is subjected to the decoloring process. Thereafter, the sheet is conveyed to the first conveyance path 14 via the junction point 26.

The sheet is conveyed again along the first conveyance path 14 and reaches the bifurcating point 24. The sheet is conveyed along the first conveyance path 14 via the bifurcating member 24a in the non-driven state and is then conveyed to the sheet discharge tray 22b.

Figure 2:
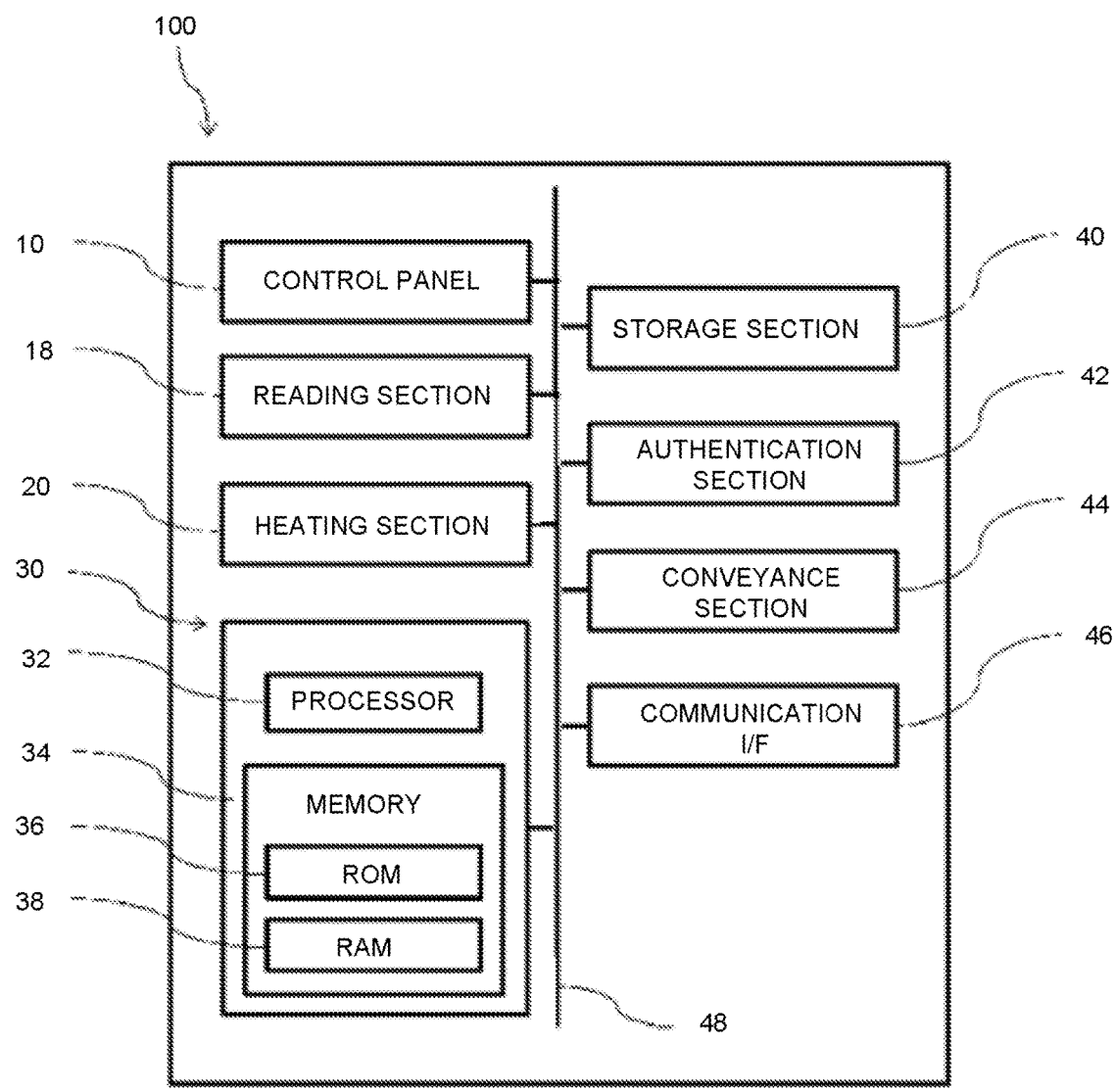
FIG. 2 is a control block diagram illustrating a hardware configuration of the image decoloring apparatus according to the first embodiment.

FIG. 2 is a control block diagram of the image decoloring apparatus 100 according to the first embodiment. The image decoloring apparatus 100 has a control panel 10, the reading section 18, the heating section 20, the controller 30, the storage section 40, an authentication section 42, a conveyance section 44 and a communication I/F 46. These sections are connected via a bus 48.

In the following description, an image formed on the sheet before the decoloring process is referred to as the first image I1 and an image formed on the sheet after the decoloring process is referred to as a second image I2. Image data acquired from the first image I1 by the reading section is referred to as first image data D1, and image data acquired from the second image I2 is referred to as second image data D2.

The controller 30 has a processor 32 which is a CPU (Central Processing Unit) or a MPU (Micro Processing Unit), and a memory 34. The memory 34 is, for example, a semiconductor memory, and has a ROM (Read Only Memory) 36 that stores various control programs and a RAM (Random Access Memory) 38 that provides a temporary work area for the processor 32. The controller 30 controls each section of the image decoloring apparatus 100 based on various programs stored in the ROM 36. The RAM 36 may temporarily store the image data read by the reading section 18.

The storage section 40 stores various image data. The various image data includes the first image data D1, the second image data D2, difference image data B and third image data D3 which are described later. As a result, when a decolored image is required, the image data corresponding to the image can be acquired.

The storage section 40 may be, for example, a hard disk drive, other magnetic storage devices, optical storage devices, semiconductor storage devices such as flash memory or the like, or may be any combination thereof.

In the storage section 40, a storage area which cannot be accessed from the outside in the memory is provided, and it is preferable to store the first image data D1 in this storage area. On the other hand, if the second image data D2 acquired from the sheet after the decoloring process is stored, the storage section 40 stores the image data as data which can be browsed or stored with a PC, or can be printed with a MFP (Multi-Function Peripheral) by a user.

The authentication section 42 acquires authentication data relating to the user. The authentication data is used for specifying the user who executes a job. For example, the authentication section 42 acquires the authentication data from a PC that sends the job and an ID card held when the operation section is operated. The authentication data may be stored in the storage section 40.

The conveyance section 44 includes a plurality of conveyance rollers 19 provided in the first conveyance path 14 and the second conveyance path 16, a sheet feed roller, the sheet discharge roller 22a, and a driving motor. These rollers are driven by the driving motor to operate.

The communication I/F 46 is used for connecting with an external device. The communication I/F 46 communicates with the external device on the network through an appropriate wired or wireless communication such as IEEE 802.15, IEEE 802.11, IEEE 802.3, etc., which are Bluetooth® Technology, infrared communication, optical communication, respectively. The communication I/F 46 may further include a USB connection section to which a connection terminal conforming to the USB standard is connected, a parallel interface, or the like. The controller 30 communicates with the MFP and other external devices via the communication I/F 46.

Figure 3:
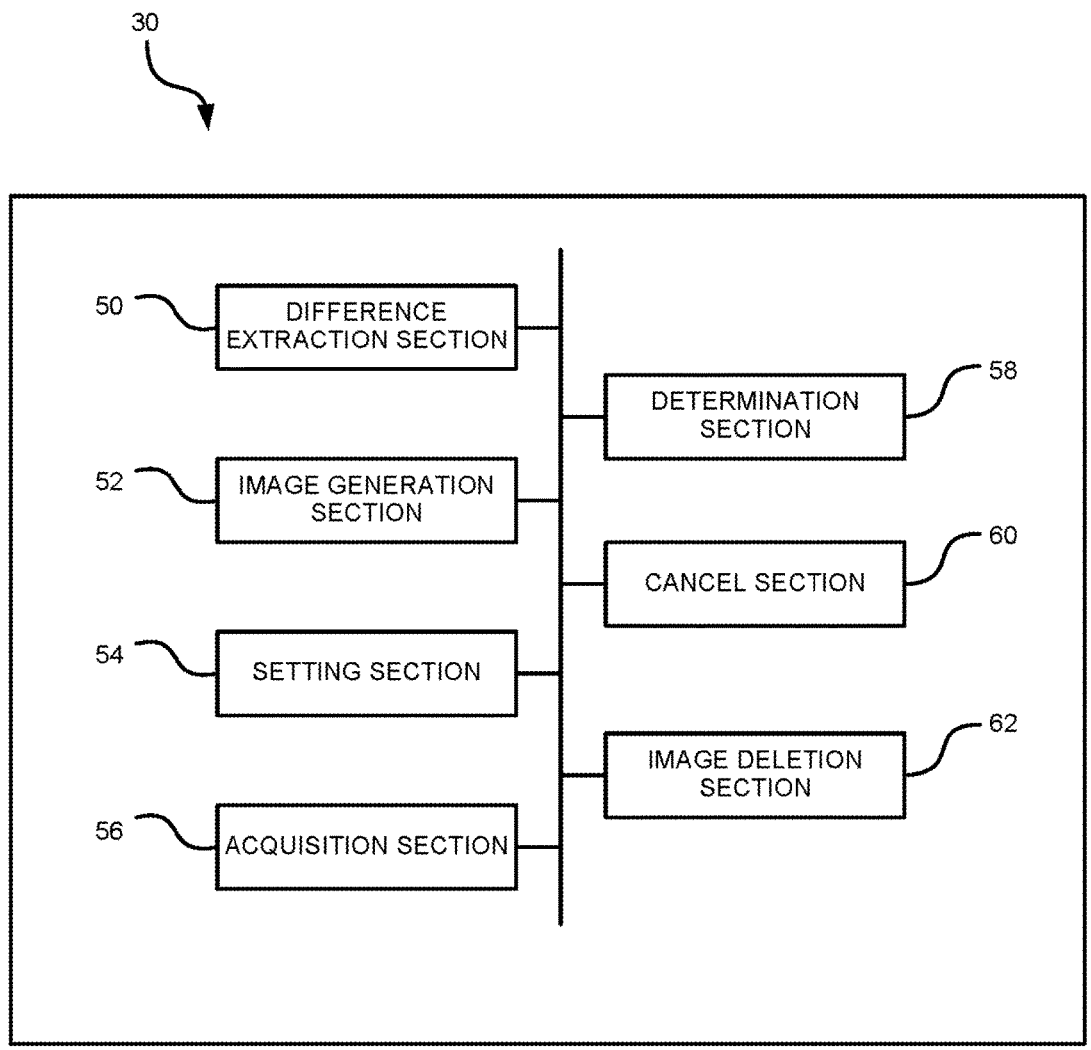
FIG. 3 is a functional block diagram of a controller according to the first embodiment.

FIG. 3 is a functional block diagram illustrating the functions of the controller 30. The controller 30 functions as a difference extraction section (a difference extractor) 50, an image generation section (an image generator) 52, a setting section (a setting input) 54, an acquisition section 56, a determination section 58, a cancel section 60, and an image deletion section 62.

The difference extraction section 50 extracts image data B (hereinafter, referred to as difference image data) of a difference between the image data stored in the storage section 40. For example, the image data D1 acquired by the reading section 18 from the image I1 on the sheet before the decoloring process and the image data D2 acquired by the reading section 18 from the image I2 on the sheet after the decoloring process are compared with each other. The difference extraction section 50 extracts the difference between these image data as the difference image data B.

In the present embodiment, a temperature T1 at which the image formed by the decolorable toner is decolored is higher than a temperature T2 at which the image formed by the decolorable ink is decolored. The heating section 20 is set at the temperature T2 at which the image by the decolorable ink is decolored.

For example, if a toner image and a handwritten image A formed with the decolorable ink are formed on the sheet, the heating section 20 executes the decoloring process to decolor the handwritten image A. Therefore, only the toner image is formed on the sheet. Therefore, if the image data before the decoloring process is compared with the image data after the decoloring process, a part of the decolored handwritten image A is extracted as the difference image data B. The controller 30 stores the extracted difference image data B in the storage section 40.

The difference extraction section 50 acquires position information of the part corresponding to the difference image data B in the first image data D1, and stores the position information in association with each of the difference image data B in the storage section 40.

The image generation section 52 generates the third image data D3 based on the second image data D2 and the difference image data B. Specifically, the third image data D3 is generated by synthesizing the difference image data B on the second image data D2 based on the position information associated with the difference image data B. Therefore, the third image data D3 is substantially the same as the first image data D1 acquired from the sheet before the decoloring process. In order to generate the third image data D3 by the image generation section 52, it is necessary to input a password set in the setting section 54 described later. The generated third image data D3 can be handled freely by being browsed, stored, or printed by the MFP.

The setting section 54 sets the password for the difference image data B. The password is used when using the difference image data B. For example, the password is used to browse the difference image data B stored in the storage section 40, and to generate the third image I3. The setting section 54 has a password setting table as shown in Table 1. "Using the difference image data B" means that the difference image data B stored in the storage section 40 is displayed on the display section, or that a composition process is executed with the difference image data B and the second image data. In other words, "Using the difference image data B" means that after the controller 30 stores "the difference image data B" in the storage section 40, the difference image data B is read from the storage section 40 to be used again.

TABLE 1

| Image data | Password |
|---|---|
| XXXXXXX.jpg | AAAAAAA |
| YYYYYYY.jpg | BBBBBBB |
| ZZZZZZZ.jpg | CCCCCCC |

For example, if the difference extraction section 50 extracts the difference image data B, the setting section 54 registers the difference image data B and a newly set password in an associated manner. The password is set by a method such as the user inputting the password into an input reception section (a receiver) via the control panel 10, for example. Even if the user does not individually set the password, the controller 30 may specify the PC of the user from the information in the ID card authenticated when performing the decoloring process, and transmit the automatically generated password to the PC to set the password.

The acquisition section 56 acquires the password from the control panel or the communication I/F. The password acquired here is referred to by the determination section 58 described later when canceling the password set in the setting section 54.

The determination section 58 confirms whether the password set in the setting section 54 matches with the password acquired by the acquisition section 56.

The cancel section 60 cancels the password of the difference image data B when the determination section 58 determines that the password associated with the difference image data B in the password setting table matches with the password acquired by the acquisition section 56.

The image deletion section 62 deletes the first image data D1 stored in the storage section 40 after the image generation section 52 generates the difference image data B based on the first image data D1 and the second image data D2.

A part or all of the difference extraction section 50, the image generation section 52, the setting section 54, the acquisition section 56, the determination section 58, the cancel section 60, and the image deletion section 62 may be realized by an ASIC (Application Specific Integrated Circuit) which is the processor 32.

Figure 4:
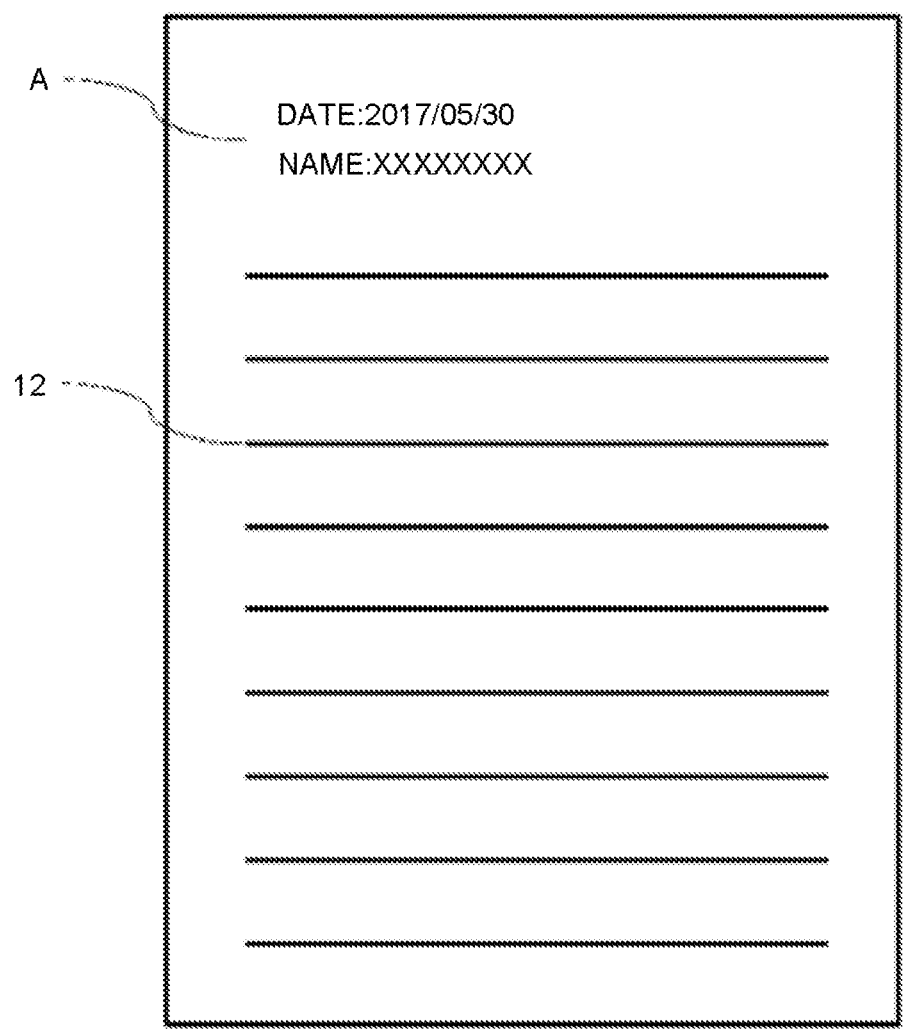
FIG. 4 is a diagram illustrating a sheet on which a handwritten image is formed according to the first embodiment.

Next, the decoloring process and the extraction of the difference image data B in the image decoloring apparatus 100 according to the first embodiment are described. FIG. 4 is a diagram illustrating a sheet on which the handwritten image A is formed with the decolorable ink. On the sheet, the handwritten image A which is formed by the decolorable ink and decolored when heated at a temperature equal to or higher than the decoloring temperature, and the second image I2 which is not decolored when heated at the temperature equal to or higher than the decoloring temperature are formed.

First, the controller 30 reads, with the reading section 18, the sheet before the heating section 20 executes the decoloring process by heating. The controller 30 stores the acquired first image data D1 in the storage section 40. The storage section 40 has an area which cannot be accessed from the outside in the memory, and stores the image data in this area. Next, the controller 30 reads, with the reading section 18, a sheet obtained by heating the handwritten image A by the heating section 20 and performing the decoloring process on the handwritten image A. The controller 30 stores the acquired second image data D2 in the storage section 40.

The difference extraction section 50 compares the first image data D1 stored in the storage section 40 with the second image data D2 to acquire the difference image data B. The controller 30 stores the acquired difference image data B in the storage section 40. At this time, the controller 30 may delete the first image data D1 from the data stored in the storage section 40. As a result, it is possible to suppress the amount of memory being used, so as to avoid limiting the amount of available memory capacity, due to the storage of the first image data D1 in the storage section 40.

Figure 5:
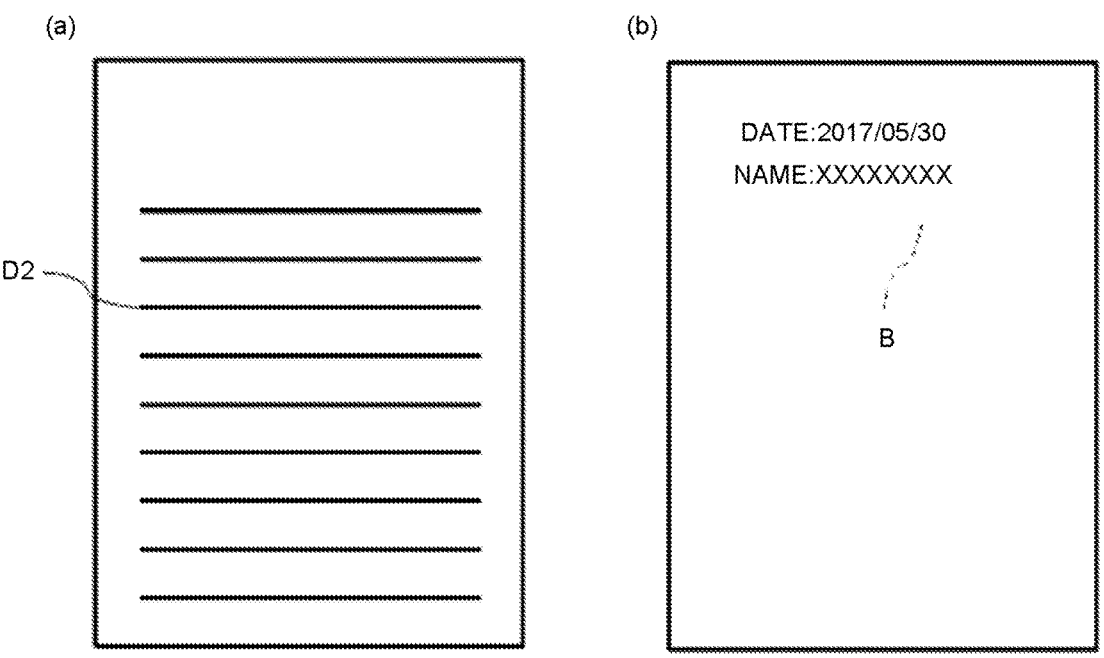
FIG. 5 is a diagram illustrating second image data and difference image data according to the first embodiment.

FIG. 5 is a diagram illustrating the second image data D2 and the difference image data B. FIG. 5(*a*) exemplifies the second image data D2, and FIG. 5(*b*) illustrates the difference image data B. The second image data D2 is the image data of an image formed on the sheet after the decoloring process at the decoloring temperature by the heating section 20. On the other hand, the difference image data B corresponds to the image data of an image decolored by the decoloring process at the decoloring temperature by the heating section 20.

The user can access the memory 34 in a main body of the image decoloring apparatus 100 using a PC to browse and store the second image data D2, or to print the second image data D2 with the MFP. Alternatively, these operations may be performed from the control panel 10 of the image decoloring apparatus 100. On the other hand, in the difference image data B, it is possible to set a password unique to the user by the setting section 54. In that case, if no password is input, the controller 30 displays the difference image data B on the display section and does not generate the third image data D3 with the image generation section 52. This can increase the confidentiality of the handwritten image A with high confidentiality.

The setting section 54 may set a password for all the image data or only for the image data having predetermined information in the difference image data B extracted by the difference extraction section 50.

Figure 6:
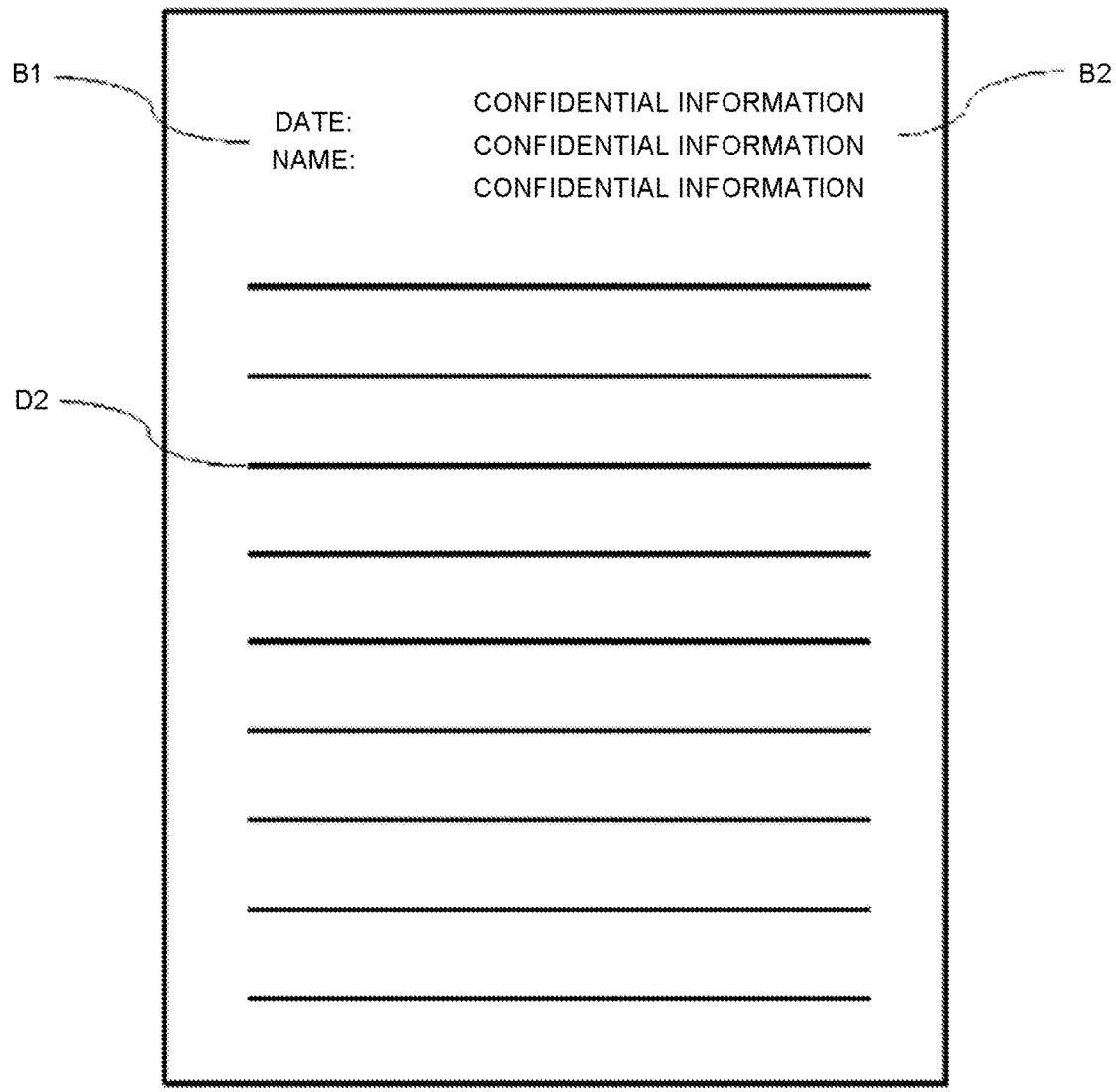
FIG. 6 is a diagram illustrating a notification of the difference image data and the second image data according to the first embodiment.

For example, FIG. 6 is a diagram illustrating the image data acquired from the sheet on which the handwritten image A is formed with the decolorable ink. On the sheet, the handwritten image A which is formed with the decolorable ink and decolored when heated at the temperature equal to or higher than the decoloring temperature, and the second image I2 which is not decolored even when heated at the temperature equal to or higher than the decoloring temperature are formed. For example, in the handwritten image A, it is assumed that simple information that is allowable to be browsed by persons is formed with black decolorable ink, and confidential information such as personal information is formed with red decolorable ink. The difference extraction section 50 acquires the difference image data B based on the first image data D1 and the second image data D2 acquired by the reading section 18 after executing the decoloring process by the heating section 20. Here, the difference linage data B corresponding to the handwritten image A formed with the black decolorable ink is referred to as difference image data B1. The difference image data B corresponding to the handwritten image A formed with the red decolorable ink is referred to as difference image data B2.

The setting section 54 sets a password only for the difference image data B2 of the difference image data B acquired here. When the image generation section 52 generates new image data based on the second image data D2 and the difference image data B1, it is not necessary to input the password. On the other hand, when the image generation section 52 generates new image data based on the second image data D2 and the difference image data B2, it is necessary to input the password.

If the reading section 18 is an OCR or the like and can identify characters and figures, the controller 30 may determine whether to set a password in the difference image data B based on the identification result.

As a result, it is possible to simply use the handwritten image A with low confidentiality while increasing the confidentiality of the handwritten image A with high confidentiality.

FIG. 7 is a diagram illustrating an example of a mail sent by the controller 30 to the PC of the user when the difference extraction section 50 generates the difference image data B. In the mail shown in FIG. 7, a password automatically set by the setting section 54 is recorded. The image generation section 52 generates the third image data D3 if the user performs an operation such as inputting the password with the control panel 10 or inputting the password on the PC.

Figure 8:
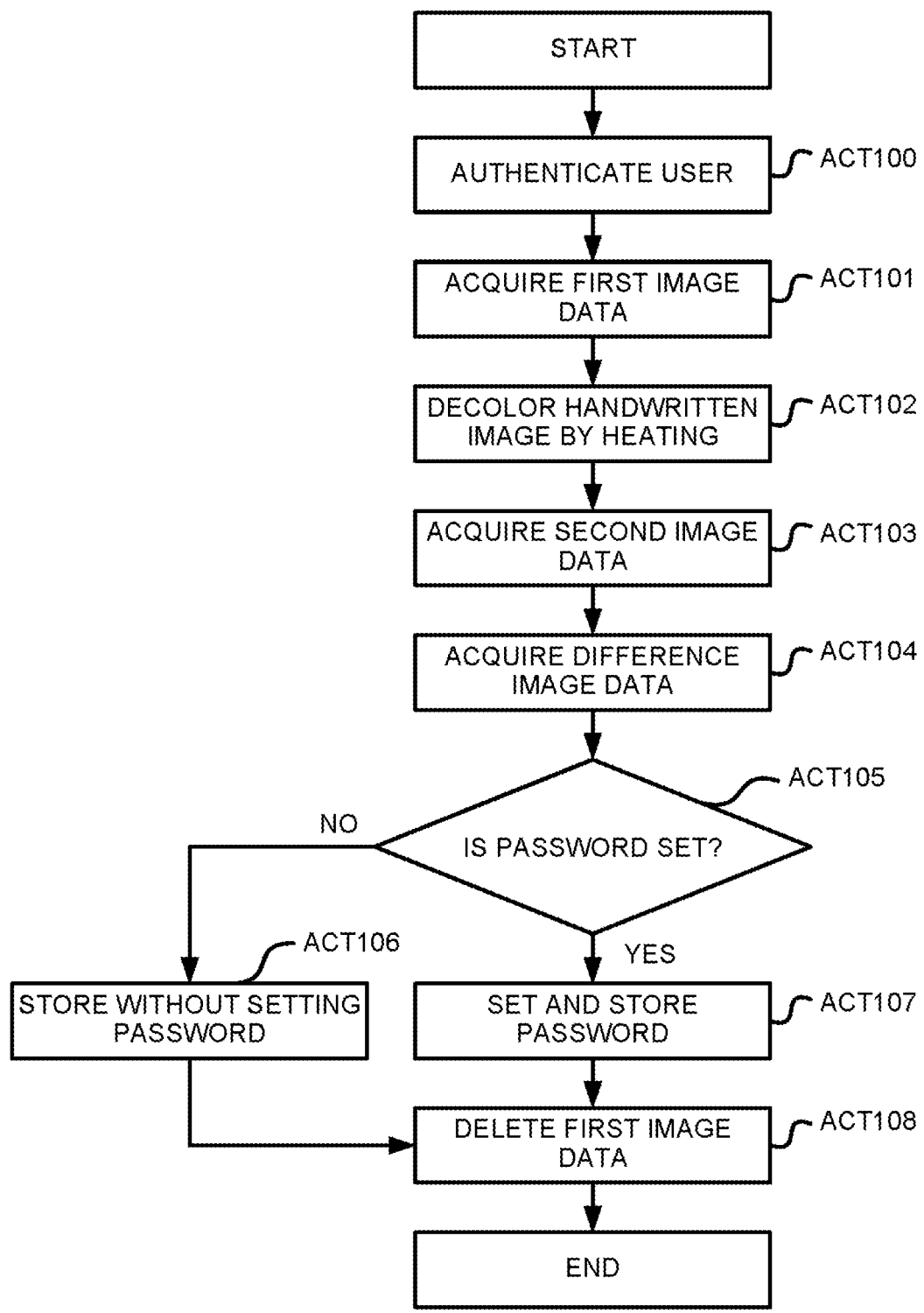
FIG. 8 is a control flowchart depicting extraction of the difference image data by the image decoloring apparatus according to the first embodiment.

FIG. 8 is a flowchart depicting an image storage processing by the image decoloring apparatus 100. First, if the authentication section 42 authenticates an ID card, and the controller 30 acquires a decoloring job, the controller 30 starts the decoloring process (ACT 100). The controller 30 reads the sheet conveyed along the first conveyance path 14 with the reading section 18 to acquire the first image data D1 (ACT 101). Thereafter, if the sheet conveyed along the first conveyance path 14 reaches the bifurcating point 24, the controller 30 sets the bifurcating member 24a in the driven state to convey the sheet to the second conveyance path 16, The controller 30 executes the decoloring process on the sheet conveyed along the second conveyance path 16 with the heating section 20 (ACT 102). As a result, the handwritten image A on the sheet is decolored. The controller 30 conveys the sheet subjected to the decoloring process to the first conveyance path 14 via the junction point 26. The controller 30 again reads the conveyed sheet with the reading section 18 to acquire the second image data D2 (ACT 103). Thereafter, the controller 30 discharges the sheet, conveyed along the first conveyance path 14 to the sheet discharge section 22.

Based on the first image data D1 and the second image data D2 acquired by the reading section 18, the controller 30 acquires the difference image data B with the difference extraction section SO (ACT 104). If the setting section 54 does not set the password for the difference image data B (No in ACT 105), the controller 30 stores the difference image data B in the storage section 40 without setting the password (ACT 106), If the setting section 54 sets the password for the difference image data B (Yes in ACT 105), the controller 30 sets the password in association with the user ID acquired with the authentication section 42 and stores the difference image data B in the storage section 40 (ACT 107). The controller 30 deletes the first image data D1 stored in the storage section 40 with the image deletion section 62 if the difference image data B is scored in the storage section 40 (ACT 108). The controller 30 terminates the decoloring process upon completion of these processes.

Figure 9:
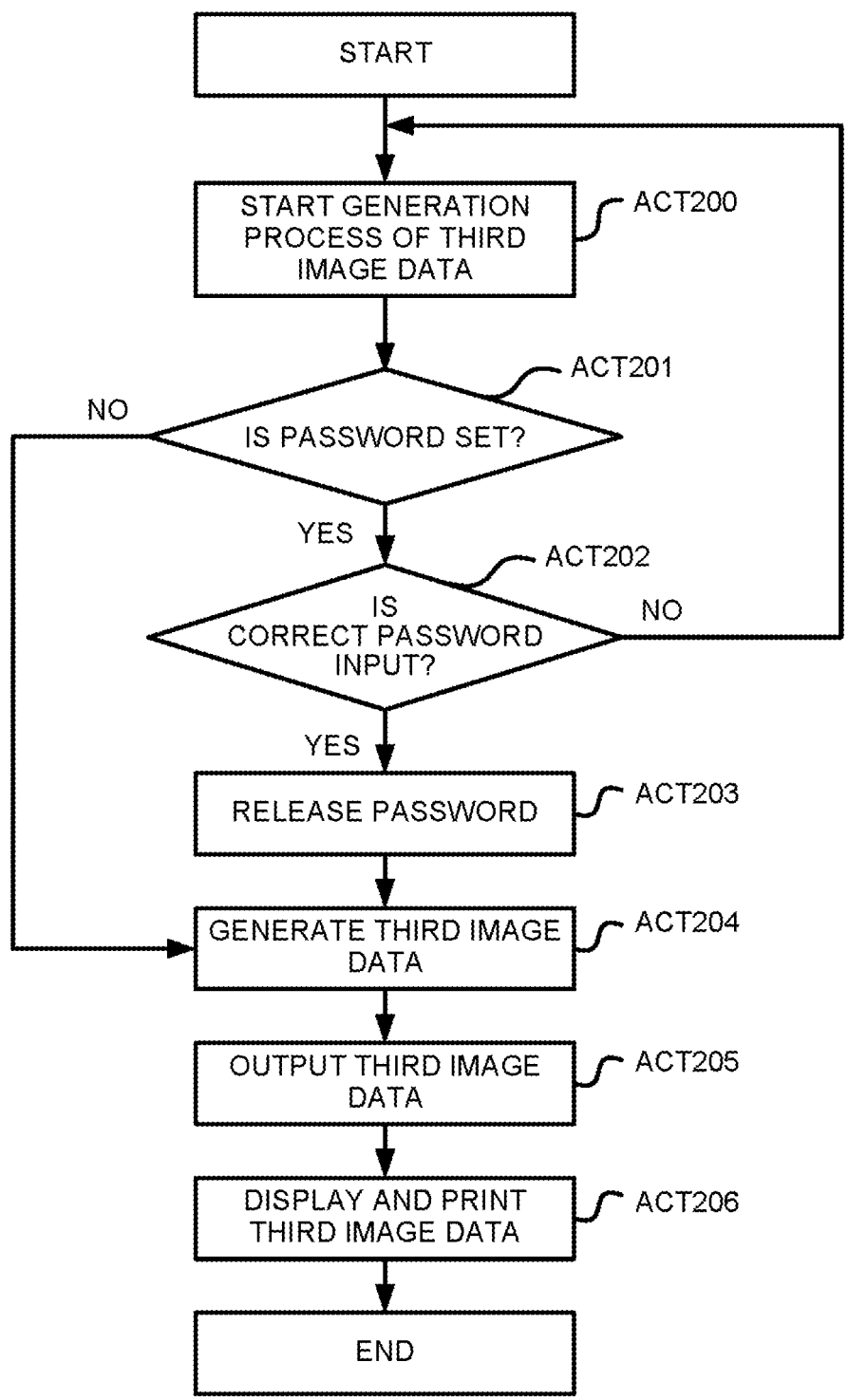
FIG. 9 is a control flowchart depicting generation of third image data according to the first embodiment.

FIG. 9 is a flowchart depicting generation of the third image data D3 according to the present embodiment. If the generation process of the third image data D3 is received from the PC, the controller 30 starts the image generation process (ACT 200). The controller 30 determines whether or not the password is set for the difference image data B used for generating the designated image data (ACT 201). If the password is not set (No in ACT 201), the controller 30 generates the third image data D3 based on the second image data D2 and the difference image data E with the image generation section 52 (ACT 204). In ACT 202, if the password is set (Yes in ACT 201), the controller 30 receives an input of the password with the acquisition section 56 (ACT 202). If the determination section 58 determines that the input password is not a correct password (No in ACT 202). the controller 30 returns to the process in ACT 200. If the determination section 58 determines that the input password is the correct password (Yes in ACT 202), the cancel section 60 cancels the password (ACT 203). Thereafter, the controller 30 generates the third image data D3 based on the second image data D2 and the difference image data B with the image generation section 52 (ACT 204). Thereafter, the controller 30 outputs the third image data D3 to the storage section 40 (ACT 205). The controller 30 displays the third image data D3 on a screen of the PC or performs printing (ACT 206). Thereafter, the image generation process is terminated.

As described above, the image decoloring apparatus 100 according to the present embodiment acquires the image data of images formed on the sheet before and after the decoloring process, sets and stores the passwords for the difference image data B of those image data, and in this way, the confidential information can be prevented from being derived from the handwritten image A.

Second Embodiment

In an image decoloring apparatus of the second embodiment, by providing a low-temperature decoloring route and a high-temperature decoloring route, it is possible to acquire the difference image data B from the handwritten image A even for the sheet on which an image is formed with the decolorable toner. Below, it is assumed that the second image I2 formed with the decolorable toner and the handwritten image A written with the decolorable ink are formed on the sheet.

Figure 10:
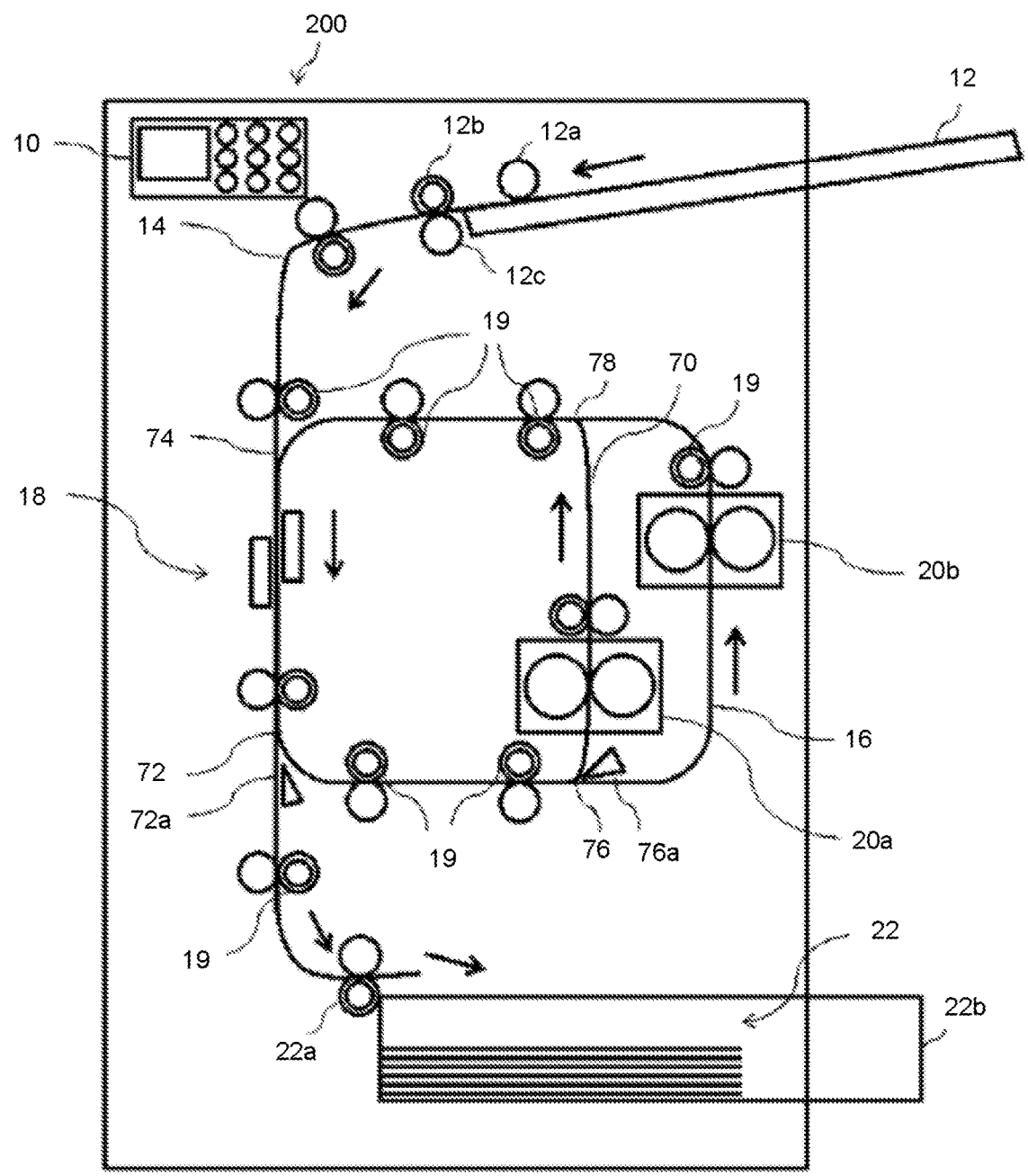
FIG. 10 is a cross-sectional view illustrating an image decoloring apparatus according to a second embodiment.

FIG. 10 is a cross-sectional view of an image decoloring apparatus 200 according to the second embodiment. In the following description, the description of the same components as the first embodiment is omitted.

The image decoloring apparatus 200 includes the control panel 10, the sheet feed tray 12, the first conveyance path 14, the second conveyance path 16, a third conveyance path 70, the reading section 18, the first heating section 20*a*, a second heating section (heater) 20*b*, and the sheet discharge section 22.

The second conveyance path 16 is connected to the first conveyance path 14 at a first bifurcating point 72 and a first junction point 74 provided at the upstream side of the first bifurcating point 72 in the first conveyance path 14. In other words, the first conveyance path 14 and the second conveyance path 16 form a circular path. A plurality of the conveyance rollers 19 is provided on the second conveyance path 16. A first bifurcating member 72*a* is arranged at the first bifurcating point 72. The controller 30 conveys the sheet convoyed through the first conveyance path 14 along the second conveyance path 16 by setting the first bifurcating member 72*a* in the driven state. The controller 30 conveys the sheet conveyed along the first conveyance path 14 to the sheet discharge section 22 by setting the first bifurcating member 72*a* in the non-driven state.

The third conveyance path 70 is connected to the second conveyance path 16 at a second bifurcating point 76 and a second junction point 78 at the downstream side of the second bifurcating point 76 on the second conveyance path 16. A plurality of the conveyance rollers 19 is provided on the third conveyance path 70. A second bifurcating member 76*a* is arranged at the second bifurcating point 76. The controller 30 conveys the sheet conveyed along the second conveyance path 16 to the third conveyance path 70 by setting the second bifurcating member 76*a* in the driven state. The controller 30 conveys the sheet along the second conveyance path 16 by setting the second bifurcating member 76*a* in the non-driven state.

The first heating section 20*a* is provided on the third conveyance path 70. The first heating section 20*a* has a roller pair and a heater, which is the same as the heating section 20 of the first embodiment. In this way, the sheet is heated and the decoloring process is performed. Hereinafter, a temperature of the first heating section 20*a* is defined as a first decoloring temperature.

The second heating section 20*b* is provided along the second conveyance path 16, between the second bifurcating point 76 and the second junction point 78. The second heating section 20*b* has a roller pair and a heater, which is the same as the heating section 20 of the first embodiment. In this way, the sheet is heated and the decoloring process is performed. Hereinafter, a temperature of the second heating section 20*b* is defined as a second decoloring temperature.

The first decoloring temperature is lower than the second decoloring temperature. Specifically, the first decoloring temperature is a temperature at which the decolorable ink is decolorable but the decolorable toner is not decolorable. The second decoloring temperature is a temperature at which both the decolorable ink and decolorable toner are decolorable.

Here, the conveyance path of the sheet conveyed along each conveyance path and the decoloring process are described. The sheet fed from the sheet feed tray 12 is conveyed along the first conveyance path 14. Thereafter, if the sheet reaches the first bifurcating point 72, the sheet is conveyed to the second conveyance path 16 via the first bifurcating member 72*a* in the driven state. If the sheet conveyed along the second conveyance path 16 reaches the second bifurcating point 76, the sheet is conveyed to the third conveyance path 70 via the second bifurcating member 76*a* in the driven state, and the decoloring process of the handwritten image A is performed by the first heating section 20*a*. Thereafter, the sheet is conveyed to the second conveyance path 16 via the second junction point 78, and is conveyed to the first conveyance path 14 via the first junction point 74 after conveyed along the second conveyance path 16.

If the sheet is conveyed again along the first conveyance path 14 and reaches the first bifurcating point 72, the sheet is conveyed to the second conveyance path 16 via the first bifurcating member 72*a* in the driven state. If the sheet conveyed along the second conveyance path 16 reaches the second bifurcating point 76, the sheet is conveyed along the second conveyance path 16 by setting the second bifurcating member 76*a* in the non-driven state. Thereafter, the decoloring process is performed on the image formed with the decolorable toner on the sheet by the second heating section 20*b*. In other words, here the second image I2 is decolorized. Thereafter, the sheet is conveyed to the first conveyance path 14 via the first junction point 74.

The sheet is conveyed again along the first conveyance path 14. If the sheet is conveyed to the first bifurcating point 72, the sheet is conveyed along the first conveyance path 14 to the sheet discharge tray 22*b* by setting the first bifurcating point 72 in the non-driven state.

If these decoloring processes are terminated, the difference extraction section 50 extracts the difference image data B from the first image data D1 and the second image data D2 like the first embodiment. The controller 30 stores the second image data D2 and the difference image data B in the storage section 40. The controller 30 may set the password for the difference image data B with the setting section 54 and store it in the storage section 40. In that case, the controller 30 notifies the user of the password by sending a mail or the like as shown in FIG. 7.

Figure 11:
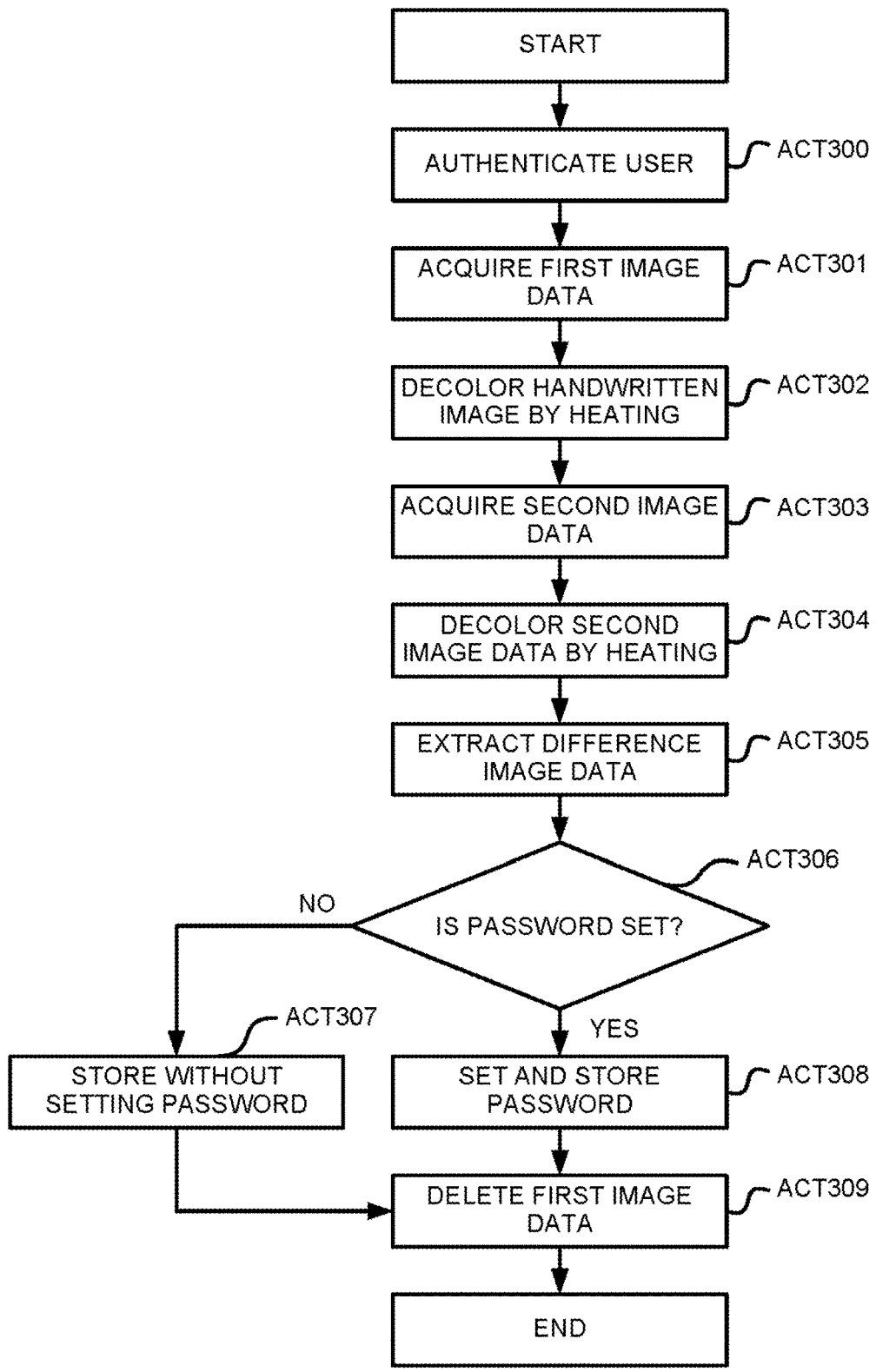
FIG. 11 is a control flowchart depicting extraction of difference image data by the image decoloring apparatus according to the second embodiment.

FIG. 11 is a flowchart depicting the image storage processing by the image decoloring apparatus 200 according to the second embodiment. First, if the authentication section 42 recognizes an ID card, the controller 30 starts the decoloring process (ACT 300). The controller 30 reads the sheet conveyed along the first conveyance path 14 with the reading section 18 to acquire the first image data D1 (ACT 301). Thereafter, the controller 30 sets the first bifurcating member 72a in the driven state to convey the sheet to the second conveyance path 16 if the sheet conveyed along the first conveyance path 14 reaches the first bifurcating point 72. Furthermore, if the sheet conveyed along the second conveyance path 16 reaches the second bifurcating point 75, the controller 30 sets the second bifurcating member 76a in the driven state to convey the sheet to the third conveyance path 70. The controller 30 executes the decoloring process with the first heating section 20a on the sheet conveyed along the third conveyance path 70 (ACT 302). In this way, the handwritten image A is decolored. The controller 30 conveys the sheet subjected to the decoloring process to the second conveyance path 16 via the second junction point 78. The controller 30 conveys the sheet conveyed along the second conveyance path 16 to the first conveyance path 14 via the first junction point 74. The controller 30 again reads the conveyed sheet in the reading section 18 to acquire the second image data D2 (ACT 303). Thereafter, the controller 30 sets the first bifurcating member 72a in the driven state to convey the sheet to the second conveyance path 16 again if the sheet conveyed along the first conveyance path 14 reaches the first bifurcating point 72. The controller 30 sets the second hifurcating member 76a in the non-driven state to convey the sheet along the second conveyance path 16. The controller 30 executes the decoloring process with the second heating section 20b on the conveyed sheet (ACT 304). As a result, the second image I2 formed with the decolorable toner is decolored. The controller 30 conveys the decolored sheet to the first conveyance path 14 via the first junction point 74. Thereafter, the controller 30 sets the first bifurcating member 72a in the non-driven state and discharges the conveyed sheet to the sheet discharge section 22.

The controller 30 extracts the difference image data B based on the first image data D1 and the second image data D2 acquired by the reading section 18 in the difference extraction section 50 (ACT 305). If the setting section 54 does not set the password for the difference image data B (No in ACT 306), the controller 30 stores the difference image data B in the storage section 40 without setting the password (ACT 307). If the password is set for the difference image data B by the setting section 54 (Yes in ACT 306), the controller 30 sets the password based on the user ID acquired by the authentication section 42 and stores the difference image data B in the storage section 40 (ACT 308). If the controller 30 stores the difference image data B in the storage section 40, the controller 30 deletes the first image data D1 stored in the storage section 40 with the image deletion section 62 (ACT 309). The controller 30 thus completes the series of the decoloring process.

As described above, the image decoloring apparatus of the present embodiment acquires the difference image data B from the image data acquired from the sheet before and after the decoloring process, and decolor both the image formed with the decolorable toner and the handwritten image A, thereby further enhancing confidentiality.

In at least one embodiment, the image decoloring apparatus is described as an exemplary implementation, but the present invention is not limited thereto. For example, the image decoloring apparatus may be an MFP having a decoloring function.

As described above, in the image forming apparatus of at least one embodiment, the handwritten image A written with the decolorable ink can be extracted from the sheet and can be managed while maintaining highly confidentially.

While certain embodiments have been described, these embodiments nave been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image decoloring apparatus, comprising;
   a reader configured to read an image on a sheet to acquire image data;
   a storage section configured to store the image data acquired by the reader;
   a first heater configured to heat the sheet;
   a difference extractor configured to extract difference image data based on first image data read from the sheet before the sheet is heated by the first heater and second image data read from the sheet after the sheet is heated by the first heater; and
   a setting section configured to set a first password to permit access to the difference image data.

2. The image decoloring apparatus according to claim 1, further comprising:
   an input receiver configured to receive an input of a second password;
   a determination section configured to determine a coincidence between the first password set by the setting section and the second password input received by the input receiver; and
   an image generator configured to generate third image data based on the second image data and the difference image data when the determination section determines that the first and second passwords match with each other.

3. The image decoloring apparatus according to claim 1, wherein
   the setting section is configured to set the first password based on at least one of a color, a character or a figure among the difference image data.

4. The image decoloring apparatus according to claim 2, wherein
   the setting section is configured to set the first password based on at least one of a color, a character or a figure among the difference image data.

5. The image decoloring apparatus according to claim 1, further comprising;
   an image deletion section configured to delete the first image data from the storage section when the difference extractor extracts the difference image data.

6. The image decoloring apparatus according to claim 1, further comprising:
   a second heater configured to heat the sheet at a temperature higher than the first heater, wherein
   the reader and the second heater are arranged such that the sheet in the reader is heated by the second heater after the reader reads the image from the sheet following heating by the first heater.

7. The image decoloring apparatus according to claim 2, further comprising:
   a cancelling section configured to cancel the first password when the determination section determines that the first and second passwords match each other.

8. The image decoloring apparatus according to claim 1, further comprising:
   an image generator configured to generate third image data based on the second image data and the difference image data, or to generate the third image data based on the second image data and other difference image data, and
   a determination section configured to permit access to the third image data that is based on the second image data and the difference image data after a second password is inputted, or to permit access to the third image data that is based on the second image data and the other difference image data without the second password being inputted.

9. An image decoloring method, including:
   conveying a sheet on which an image is formed on a surface thereof;
   reading the surface of the conveyed sheet;
   acquiring first image data indicative of image data on the sheet;
   heating the sheet with a first heater;
   reading the surface of the sheet after the sheet is heated;
   acquiring second image data indicative of image data of the sheet after the sheet is heated;
   extracting difference image data based on the first image data and the second image data; and
   setting a first password to permit access to the difference image data.

10. The image decoloring method according to claim 9, further comprising:
    receiving an input of a second password;
    determining a coincidence between the first password and the second password; and
    generating third image data based on the second image data and the difference image data upon determining that the first and second passwords match with each other.

11. The image decoloring method according to claim 9, further comprising:
    setting the first password based on at least one of a color, a character or a figure among the difference image data.

12. The image decoloring method according to claim 10, further comprising:
    setting the first password based on at least one of a color, a character or a figure among the difference image data.

13. The image decoloring method according to claim 9, further comprising:
    deleting the first image data from storage upon extracting the difference image data.

14. The image decoloring method according to claim 9, further comprising:
    heating, by a second heater, the sheet at a temperature higher than the first heater, wherein
    the sheet in the reader is heated by the second heater after the reader reads the image from the sheet following heating by the first heater.

15. The image decoloring method according to claim 10, further comprising:
    cancelling the first password upon determining that the first and second passwords match each other.

16. The image decoloring method according to claim 9, further comprising:
    generating third image data based on the second image data and the difference image data, or generating the third image data based on the second image data and other difference image data, and
    permitting access to the third image data that is based on the second image data and the difference image data after a second password is inputted, or permitting access to the third image data that is based on the second image data and the other difference image data without the second password being inputted.

* * * * *